United States Patent [19]

Cline

[11] 4,009,319
[45] Feb. 22, 1977

[54] REGENERATED CELLULOSE FILM, ALUMINUM FOIL LAMINATES AND METHOD FOR PRODUCING SAME

[75] Inventor: Warren K. Cline, Brevard, N.C.

[73] Assignee: Olin Corporation, Pisgah Forest, N.C.

[22] Filed: Mar. 1, 1976

[21] Appl. No.: 662,599

[52] U.S. Cl. .............................. 428/424; 428/425; 428/464; 428/485; 428/532; 428/457
[51] Int. Cl.$^2$ .................. B32B 27/40; B32B 15/00
[58] Field of Search .......... 428/424, 464, 532, 485, 428/457, 425; 106/168; 426/126

[56] References Cited

UNITED STATES PATENTS

| | | | |
|---|---|---|---|
| 2,328,679 | 9/1943 | Rothrock | 106/168 |
| 2,721,150 | 10/1955 | Grantham | 428/532 |
| 2,987,418 | 6/1961 | Wooding | 428/464 |
| 3,009,831 | 11/1961 | Wilfinger | 428/532 |
| 3,168,409 | 2/1965 | Wellisch | 106/108 |
| 3,248,254 | 4/1966 | Zenk | 428/425 |
| 3,490,987 | 1/1970 | Bauriedel | 428/425 |
| 3,616,190 | 10/1971 | Shaw | 428/424 |
| 3,759,379 | 9/1973 | Wrede | 428/425 |
| 3,840,395 | 10/1974 | Koch | 106/108 |

OTHER PUBLICATIONS

"Cellophane", Encyclo. of Poly. Science and Tech., vol. 3, pp. 60–79, 1965.

*Primary Examiner* — Ellis P. Robinson
*Attorney, Agent, or Firm* — Robert W. Habel

[57] ABSTRACT

Laminates of uncoated regenerated cellulose film and aluminum foil comprising the combination in which the cellulose film is softened or plasticized with a lower alkylene polyalkylene glycol and bonded with the aluminum foil using a polyethylene phthalate ester-urethane adhesive. The resulting laminate structure possesses superior resistance to delamination when compared with similar laminates of coated regenerated cellulose film and aluminum foil or such laminates in which the cellulosic film is softened with conventional monomers, such as ethylene glycol, propylene glycol or glycerin. Preferred softeners for use in the combination are polyethylene glycols or polypropylene glycols having a molecular weight ranging from 200 to 800.

4 Claims, No Drawings

REGENERATED CELLULOSE FILM, ALUMINUM FOIL LAMINATES AND METHOD FOR PRODUCING SAME

BACKGROUND OF THE INVENTION

This invention relates generally to laminates of regenerated cellulose film and aluminum foil and more particularly to an improved laminate of such materials having a superior resistance to delamination.

Bonding of coated regenerated cellulose film to aluminum foil through the use of various adhesives is well known in the packaging industry. With such laminates the film used is a synthetic polymer coated cellulosic film, the coating usually being saran or some form of polyvinylidene chloride resin. The coated film is then laminated to the aluminum foil either with or without the application of an adhesive to assure the necessary bond between the two materials. The use of uncoated regenerated cellulose films in laminates with aluminum foil has generally not been attempted because of the difficulty in achieving a direct bond between cellulose film and aluminum foil, no matter what adhesive is used to bond the two together. When such uncoated cellulose film/aluminum foil laminates are later coated and employed in packaging and the package heat-sealed, the structure tends to delaminate because of failure of the adhesive bond between the plies of cellulose film and aluminum foil. Exact temperatures of the failure will depend upon the exposure time and to some degree on the pressures and other mechanical stresses to which the film is subjected during the sealing operation. In any event, it is common for delamination to occur and the conditions required for delamination are encountered in many packaging machines, severely limiting the applications in which uncoated cellulose film/aluminum foil laminated structures can be used.

SUMMARY OF THE INVENTION

Accordingly, it is an object of this invention to provide an improved laminate of uncoated regenerated cellulose film and aluminum foil and the method for making such laminates. Another object of this invention is to provide laminates of aluminum foil and uncoated regenerated cellulose film in which the bond between the two materials is greatly enhanced. A specific object of this invention is to provide an uncoated regenerated cellulose film and aluminum foil laminate which can be used for packaging purposes and which will not delaminate during the heat-sealing operations normally encountered when the material is utilized.

Surprisingly, we have found that uncoated regenerated cellulose film can be laminated directly to aluminum foil using a polyethylene phthalate ester-urethane type adhesive provided the uncoated cellulose has been softened or plasticized with a lower alkylene polyalkylene glycol. Such structures have a good initial or green bond between the aluminum foil and regenerated cellulose film and this bond remains strong as the film ages. While it is well known to plasticize regenerated cellulose films with some type of softening agent such as glycerin, propylene glycol and polyethylene glycol, it was not heretofore known that uncoated regenerated cellulose films plasticized with a lower alkylene polyalkylene glycol could be directly laminated with aluminum foil using a polyethylene phthalate ester-urethane adhesive as the bonding agent and achieve a bond that would not delaminate under high heat. Preferably, the regenerated cellulose film is softened during production by treating the gel state web of cellulose with a plasticizer consisting of polyethylene or polypropylene glycol having a molecular weight ranging from 200 to about 800 and drying the softened gel state web to an appropriate moisture content. Prior to laminating, a polyethylene phthalate ester-urethane adhesive is applied to the treated cellulose film and it is thereafter laminated with aluminum foil using conventional laminating apparatus.

DESCRIPTION OF PREFERRED EMBODIMENTS

The regenerated cellulose films used in the instant product and process are prepared by the conventional viscose process in which an alkaline aqueous solution of sodium cellulose xanthate is forced through an elongated orifice in the form of a continuous sheet into an acid coagulating bath where a coherent web is formed and the cellulose regenerated and thereafter washed, desulfured and bleached. At this point, the resultant gel state web is in a highly swollen state and in accordance with the instant invention is softened by passing it through a tank containing an aqueous solution of a lower alkylene polyalkylene glycol such as polyethylene glycol or polypropylene glycol. The resulting softener treated film is then dried to reduce the moisture content thereof to about 4 to 8% based upon the weight of the dry cellulose in the film. Before laminating, an adhesive solution is applied to the treated cellulose film comprising a solution of polyethylene phthalate ester-urethane resin applied in a gravure coater and the resulting film then dried in hot air on a drum dryer. The film is then laminated with aluminum foil with the surface of the film on which the adhesive has been applied between the two by passing the film and foil through the nip between a pair of heated rolls, such as a heated chrome roll and a rubber roll. Many variations on this aspect of the invention are possible, for example the adhesive can be applied by means of a simple roll coater or size press or it can be applied to the aluminum foil instead of the cellulose film. Also, the cellulose film may be combined with the aluminum foil on one or both sides thereof.

The structural formulas of the polyethylene or polypropylene glycols used as the cellulose film softeners are respectively as follows:

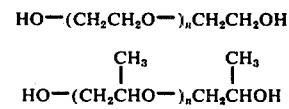

While the molecular weight of the polyglycol may range from 200 to about 800, it is preferable if the average molecular weight is about 600. The concentration of the softener in the aqueous solution may vary over a fairly wide range. However, solutions containing from about 5 to 10 percent by weight polyglycol softener are most satisfactory. In any event, the aqueous softener solution should consist essentially of the polyglycol softener and water. While mixtures of polyglycols can be used, no other plasticizer should be used in the solution. Softener bath temperatures of 60° to 80° C are very satisfactory to achieve the desired effect upon the cellulose web as it passes through the bath.

The softener treated cellulose film is bonded to aluminum foil using any of the commercially available polyethylene phthalate ester-urethane type adhesives. Such adhesives usually comprise a two-part combination of polyethylene phthalate ester resin modified with an isocyanate curing agent to form the polyethylene phthalate ester-urethane. They are sold commercially for use in laminating various films, foils, papers and the like under the trademark Adcote 76D-108 or Adcote 503 by Morton Chemical Company of Chicago, Illinois. Similar adhesives are also available from the Du Pont Company sold under the polyester adhesive grade designation, series 49000 modified with isocyanate curing agents RC-805 or RC-829. The particular adhesive used is not critical so long as it is one of the conventional polyethylene phthalate ester-urethane types. The phthalate ester can be either the isophthalate or terephthalate isomer or combinations thereof.

The polyglycol softened cellulose film/aluminum foil laminates of this invention are commonly used in food packaging. For this application, after laminating the film and foil together, the resulting laminate is coated on one or both sides with a polyvinylidene chloride coating. When such coated laminates are run on a horizontal form, fill and seal machine at 60 packages per minute, the structure will not delaminate at the crimp seal at temperature as high as 500° F. In contrast, identical laminates containing cellulose film softened with a plasticizer such as propylene glycol or glycerin will delaminate at the crimp seal at temperatures below 450° F, thus evidencing the superior resistance to thermal delamination of the polyglycol softened cellulose/aluminum foil laminates of the instant invention.

Although the present invention has been described in conjunction with the preferred embodiments, the examples and description are only illustrative thereof and many variations and modifications will be apparent to those skilled in he art. Therefore, it is intended that the invention only be limited to the extent set forth in the following claims.

What is claimed is:

1. A laminated sheet material for use in making heat sealable packages having superior resistance to thermal delamination at crimp seal temperatures above 450° F, comprising a web of regenerated cellulose film that has been softened in the wet gel state with an aqueous softener solution consisting essentially of a lower alkylene polyalkylene glycol and water and thereafter dried to a moisture content of about 4 to 8% based on the weight of the dried cellulose in the film and a web of aluminum foil, said film and foil bonded together exclusively with a polyethylene phthalate ester-urethane adhesive in the absence of any synthetic polymer coating applied to either of the bonding surfaces of said film and said foil other than residual amounts of said softener that might remain on the surface of said film.

2. The laminated sheet material of claim 1 in which the lower alkylene polyalkylene glycol has a molecular weight ranging from about 200 to 800.

3. The laminated sheet material of claim 1 in which the lower alkylene polyalkylene glycol is selected from the group consisting of polyethylene glycol and polypropylene glycol.

4. The sheet material of claim 1 in which the lower alkylene polyalkylene glycol is polyethylene glycol having an average molecular weight of about 600.

* * * * *